Jan. 14, 1930.  B. F. SCHMIDT  1,743,241
GEAR SHIFT LEVER CONSTRUCTION
Filed Nov. 18, 1926   2 Sheets-Sheet 1
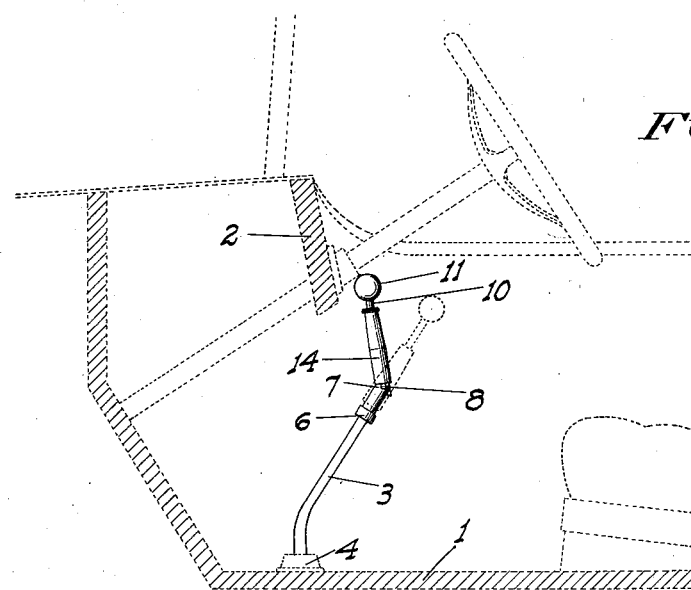
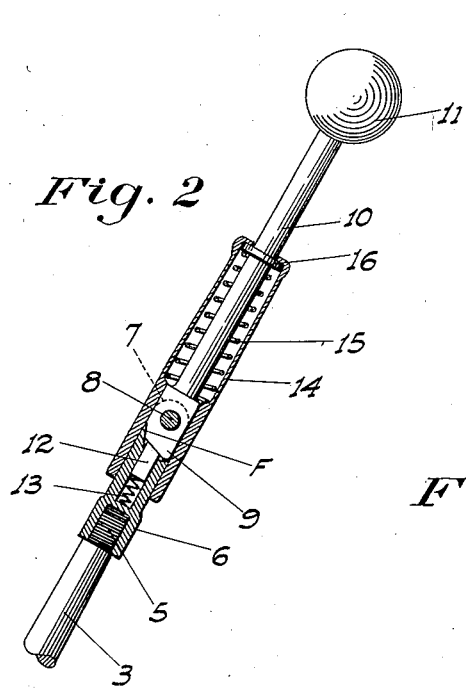
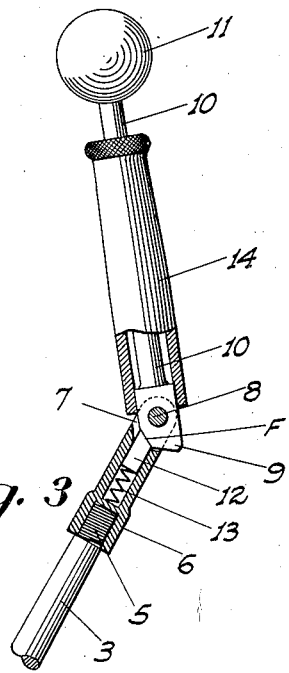
INVENTOR.
B. F. Schmidt
BY
ATTORNEY Jan. 14, 1930.  B. F. SCHMIDT  1,743,241
GEAR SHIFT LEVER CONSTRUCTION
Filed Nov. 18, 1926  2 Sheets-Sheet 2
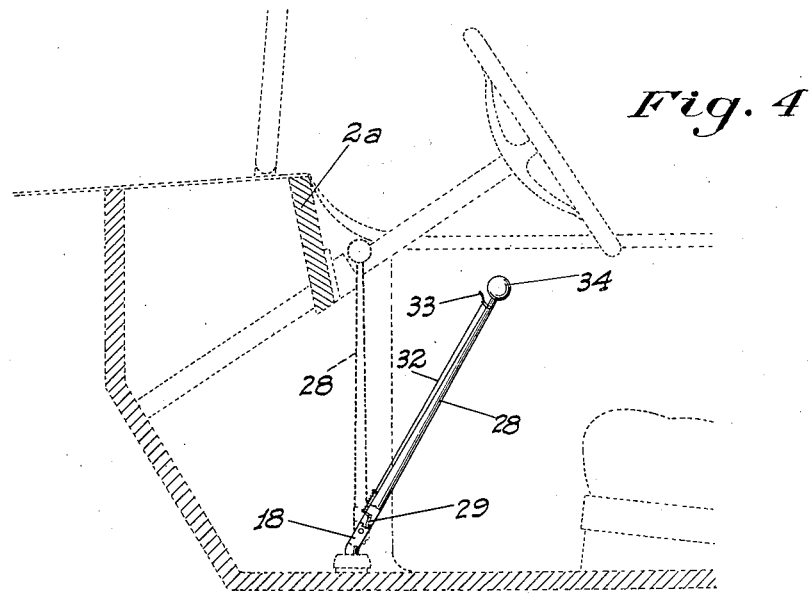
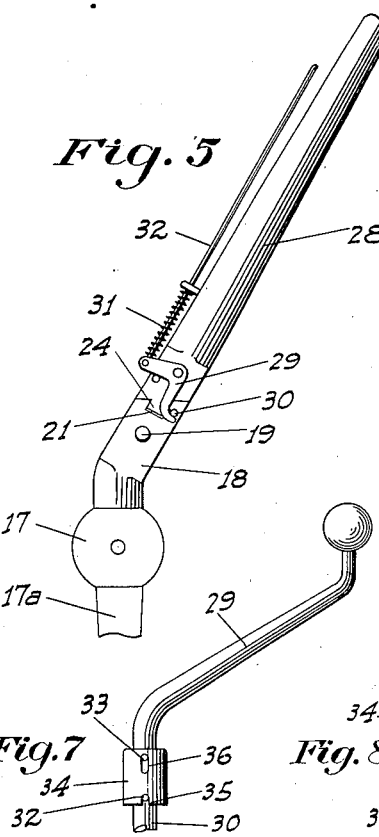
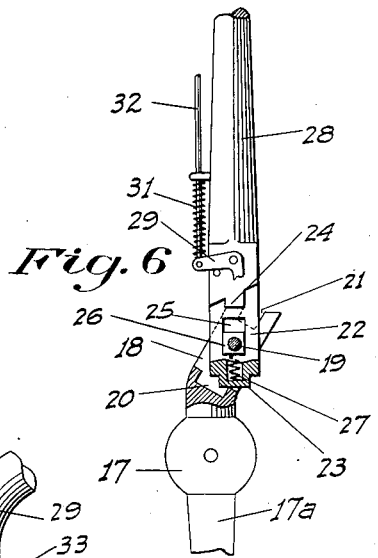
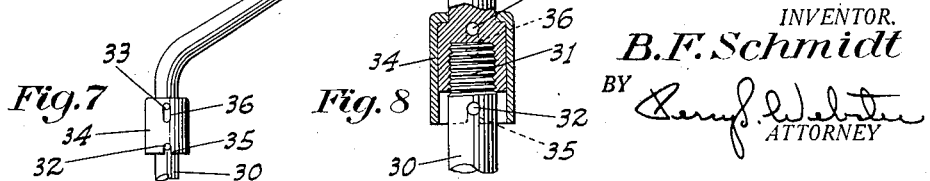
INVENTOR.
B. F. Schmidt
BY
ATTORNEY Patented Jan. 14, 1930

1,743,241

UNITED STATES PATENT OFFICE

BENJAMIN F. SCHMIDT, OF LOS ANGELES, CALIFORNIA

GEAR-SHIFT-LEVER CONSTRUCTION

Application filed November 18, 1926. Serial No. 149,014.

This invention relates to gear shift levers such as are used in automobiles. These levers when in their neutral position practically all extend upwardly from the transmission casing at a rearward angle to such an extent that they are considerably in the way of the freedom of side-to-side movement of the occupants of the front compartment of the car.

The principal object of my invention therefore is to eliminate this objectionable feature, without altering the mounting of the lever in the transmission housing or its normal position relative to the floor and instrument or dash board of the car, by interposing a normally unyielding hinge means in the lever for enabling any part of the upper portion of the lever to be moved forwardly at the option of the driver, and without causing the shifting arm at the lower end of the lever to be moved from its neutral position. The extent to which the lever will be thus moved will depend on the longitudinal distance from the point of connection of the lever with the transmission structure and the dashboard in any individual car; and is preferably so designed as to cause the top of the lever to lie adjacent the dashboard when said lever is thus moved.

My device may be built into the lever at the factory, to form an integral part thereof, or it may be provided as an attachment which may be readily applied to the lever, as hereinafter explained.

While the accompanying drawings illustrate two forms which the device may assume, it is to be understood that such specific forms and their positions on the levers are capable of being altered considerably without departing from the main spirit of the invention.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a longitudinal outline of the driver's compartment of an automobile showing the shifting lever with one form of hinge structure applied thereto as an attachment.

Fig. 2 is an enlarged fragmentary elevation of the lever showing said hinge structure in its normal position, when the parts of the lever are maintained as a rigid unit.

Fig. 3 is a similar view partly in section showing the hinge structure as released and the upper portion of the lever moved forwardly.

Fig. 4 is a longitudinal outline of the driver's compartment of an automobile, showing the shifting lever with another form of hinge structure built into said lever adjacent its lower end.

Fig. 5 is an enlarged fragmentary elevation of the lever of the type shown in Fig. 4, with the hinge structure thereof in its normally locked position.

Fig. 6 is a similar view partly in section showing the hinge unlocked or released and the upper portion of the lever shifted forwardly.

Fig. 7 is a side elevation of a modified form of attachment applied to a shift lever extension, to enable said extension to be turned laterally out of the way.

Fig. 8 is a vertical section of the attachment.

Referring now more particularly to the characters of reference on the drawings, and particularly at present to Figs. 1 to 3, 1 denotes the floor of the driver's compartment of an ordinary automobile, and 2 the instrument or dashboard. The gear shift lever 3 projecting upwardly from the upper extension 4 of the transmission housing as usual extends when in its neutral position at a rearward angle so that the upper end of the lever is then some distance rearwardly of the dashboard.

In applying my hinge structure to the lever as an attachment, any suitable amount of the upper portion of the lever is cut off, the upper end of the remaining lower portion being threaded as at 5. Screwed onto this threaded portion is a member 6, the upper end of which is forked as at 7, and has a transverse pin 8 therethrough. Fitting between the forks and mounted on the pin is a tongue 9 which is formed on or secured to the lower end of a length of rod 10, having the usual knob 11 on top, which may be the one salvaged from the cut off portion of the original lever. The length of rod 10 is such that when the main lever portion 3 and said rod are in longitudinal alinement the knob will set at the same height as that occupied by the knob when on the original lever. Mounted in the member 6 below the tongue is a longitudinally disposed pawl 12 adapted to engage the lower end of the tongue and constantly pressed thereagainst by a spring 13.

Slidable on the rod 10 and the tongue 9 is a sleeve 14 which is constantly pressed toward the lower end of said rod by a spring about the rod inside the sleeve and which bears at its lower end against the sleeve and at its upper end against a collar fixed on the rod. This collar also acts as a stop for the downward movement of the sleeve on the rod, in which position the sleeve also overhangs and envelopes a considerable portion of the member 6. The sleeve then has a snug fit with said member and the tongue so that there is no loose play between these parts. When the sleeve is in this position therefore the lever is practically a rigid unit from end to end, the hinge being unable to function owing to the enclosing sleeve, and the lever may then be moved to shift the various gears in the usual manner.

When it is desired to throw the upper portion of the lever out of the way, to increase the width of the transverse passage area in the car, the sleeve 14 is raised by the operator so that it will clear the tongue 9. The upper portion of the lever may then be turned forwardly on the pin 8 as an axis, as shown in Fig. 3, until said upper portion assumes a position adjacent and substantially parallel to the dashboard 2 as shown in Fig. 1.

With the lever portion 10 thus positioned the pawl 12 bears against a flat face F on the tongue 9, as shown in Fig. 3, thus holding the tongue and consequently the rod 10 against too easy displacement from its present position. The sleeve will not then drop, since it is resting on top of the member 6, which is now out of line with the sleeve.

When it is desired to manipulate the lever for gear shifting purposes, it is only necessary to pull the knob 11 rearwardly. As soon as the rod 10 becomes alined with the lever 3 the tongue will be alined with the member 6, and the sleeve will drop of itself over said member, restoring the desired rigidty to the lever structure.

It will be obvious that the hinge attachment may be placed at any point in the length of the lever above the fork shifting arm thereof, the particular location of the hinge depending on the relative positions of the dashboard and member 4, and the initial angle of the lever relative to the floor.

It will also be obvious that the structure may be built into the lever by merely forming the members 3 and 6 integral. Though I believe that the movement of the portion 10 in a vertical longitudinal plane is the most practicable, the member 6 may if desired be set on the lever 3 so that the pin 8 extends longitudinally of the vehicle. In this case of course the turning of the rod on the pin will take place laterally of the vehicle to one side or the other of the main lever 3.

The above described structure may be considered as the automatic locking type. In Figs. 4 to 6 I have shown a manually locking hinge structure applied to a shift lever as a built-in device and near the lower end thereof.

In this form of the device the lever just above the usual ball 17 is formed with a vertically forked member 18 with a transverse pin 19 therethrough. At the bottom of and between the forks a socket 20 is formed, while notches 21 are cut downwardly from the top of the forks. A tongue 22 fits between the forks, said tongue having a lug 23 on its lower end to fit the socket 20 and having side lugs 24 at the top to fit the notches 21. The tongue has a longitudinal slot 25 intermediate its ends in which rides a block 26 turnable on the pin 19. The block engages the sides of the slot but said slot is sufficiently longer than the block to allow of a longitudinal movement of the tongue sufficient for the lugs to clear their seats in the forked member. The tongue is normally maintained depressed in the fork member by a spring 28 mounted therein below the block and bearing thereagainst. Above the tongue and formed integral therewith is the main lever member 28, and it will be seen that when the tongue is in the above described engaged position with the forked member, the lever 28 and the fork shifting arm 17ª below the ball 17 will form a rigid unit.

To enable the upper lever portion 28 to be turned about the pin 19, it is necessary for the operator to pull said lever upwardly against the resistance of the spring 27, so that the lugs 23 and 24 clear their respective seats. The lever 28 can then be turned to the position shown in Fig. 6 and indicated in dotted lines in Fig. 4. In this position of the lever the bottoms of the lugs 24 on the tongue rest on top of the forks ahead of the notches 21 so that the tongue tends to remain in that position. The top of the member 18 is cut on a diagonal in such a direction that the tongue and lever 28 cannot be turned rearwardly.

If necessary to prevent accidental raising and turning of the lever 28 I may mount a catch member 29 on said lever adjacent the member 18, to normally engage a pin 30 projecting from one side of said member; a spring 31 acting to hold the catch and pin engaged. The catch may be released at will when desired to raise the lever by any suitable means, such as a pull rod 32 extending upwardly from the catch along the lever and connected to a trigger 33 mounted on the lever adjacent the top knob 34 thereof.

The extent to which the lever 28 is allowed to turn on the lower portion is designed to permit said lever to assume an upright position adjacent the instrument dashboard 2ª, as shown in dotted lines in Fig. 4.

Though I have shown this type as being near the bottom of the lever and formed integral therewith it may of course be located higher up on the lever, and it may also be made as an attachment to be applied to the lever in a manner similar to the first described type.

In Figs. 7 and 8, I have shown an attachment for use in connection with the rearwardly projecting shift-lever extension 29 such as is put out by some manufacturers for attachment to the main shift lever 30, my attachment being for the purpose of enabling the extension to be turned on the lever laterally of the vehicle so as to move it out of the way when desired.

The extension is turnably screwed onto the lever as shown at 31; the lever having a transverse pin 32 below the extension and the latter having a transverse pin 33 above the lever. Slidable on the extension is a sleeve 34, having open ended slots 35 at the bottom to receive the ends of the pin 32, and closed vertical slots 36 adjacent the top to receive the pin 33. It will therefore be seen that when the sleeve is in its lowermost position, the sleeve slots are engaged with both pins, and the lever cannot turn relative to the extension. If the sleeve is raised so that the lower pin 32 clears the sleeve, the latter, and the extension can be turned on the lever, and said extension may therefore be disposed to lie laterally of the vehicle. When the driver desires to use the extension, he needs only pull it around until the slots 35 aline with the pin 32, when said sleeve will drop and lock the lever and extension against relative movement.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In lever construction, a pair of lever sections, means connecting the same to allow one section to swing relative to the other, means mounted in connection with one section and acting automatically to yieldably hold the sections in rigid relationship and in a predetermined position, and additional manually controlled and releasable means mounted in connection with the sections for non-yieldably holding the sections in such rigid relationship.

2. In a gear shift lever construction, a pair of lever sections, hinge means connecting the same and comprising a forked end on one section, a tongue on the other section extending between the forks and a pivot pin through the forks and tongue, a spring-pressed pawl mounted in the forked section and pressing against the inner end of the tongue, the engaging faces of the tongue and pawl being arranged to cause the sections to be maintained substantially rigid with each other, both when the sections are longitudinally alined with each other and when one section is turned relative to the other to a predetermined extent, and additional releasable means for holding the sections rigid when in longitudinal alinement with each other.

3. A gear-shift lever comprising separate lever sections, hinge means connecting the same to enable the upper section to be swung through a predetermined arc, means mounted in connection with the sections to yieldably hold them against relative movement when the upper section is at its limit of swinging movement in one direction, and separate releasable means mounted in connection with one section to automatically and non-yieldably hold the sections against relative movement only when the upper section is swung to its other limit of movement.

In testimony whereof I affix my signature.
BENJAMIN F. SCHMIDT.